United States Patent Office 3,067,064
Patented Dec. 4, 1962

3,067,064
PROCESS FOR PREPARING THIN BOILING STARCHY MATERIALS
Ross J. Carey, Kankakee, Ill., assignor to General Foods Corporation, White Plains, N.Y., a corporation of Delaware
No Drawing. Filed Dec. 10, 1958, Ser. No. 779,279
8 Claims. (Cl. 127—32)

This invention relates to thin-boiling starchy materials and to a process for preparing the same. More particularly, it relates to free-flowing, thin-boiling starchy materials and a technique for producing the same.

As is well known to those skilled-in-the-art, starchy materials typified by ordinary flours or starches prepared from corn, tapioca, potato, sorghum, sago, etc. when heated in the presence of large excess of water, i.e. in the form of a solution or suspension, thicken on boiling and remain thick on cooling. The so-called thin-boiling starchy materials, on the other hand, are characterized by the ability to form solutions or suspensions which do not thicken on heating or gel on subsequent cooling. Thin-boiling starchy materials are found to be particularly useful in compositions for sizing textiles or papers, for glues or for adhesives.

Starchy materials are characterized by their curves of viscosity as a function of temperature as recorded on an Amylograph. The Amylograph curve of a typical starchy material which is not thin-boiling is characterized by a low initial slope portion during which the viscosity rises very slowly as the temperature is increased, and a rapidly rising slope portion during which the viscosity increases sharply as the temperature rises. In the case of corn starch the viscosity may rise to 500 cp. On the other hand, a thin-boiling starchy material has a curve of viscosity as a function of temperature which is essentially flat, i.e. as the temperature increases, the viscosity remains at the same low level.

Heretofore thin-boiling starchy materials have been made from e.g. corn flour or starch by acidifying a solution and maintaining the aqueous system under controlled temperature conditions for about 12 hours. Alternatively, it has been found possible to produce thin-boiling starchy materials by use of enzymes in a liquid system by contact for about one hour.

These techniques are expensive to operate in that they require a considerable degree of control over the acid or the enzyme. The raw materials, acid or enzyme, are expensive and require use of handling techniques quite outside the scope of those familiar to the typical miller. Most important, however, is the fact that these processes are conducted in the wet state. It is apparent that wet processing techniques involve a large capital outlay. Furthermore, wet processing may be difficult in a dry mill, such as a dry corn mill, as ordinarily these mills are not equipped to handle solutions or slurries.

It is an object of this invention to produce thin-boiling flours and starches by use of dry-milling techniques. Other objects will be apparent to those skilled-in-the-art on inspection of the following description.

According to certain aspects of this invention, a thin-boiling, free-flowing starchy material characterized by swollen cells or granules and unbroken cell walls may be prepared by heating a tempered starchy material in dry state preferably in the presence of live steam, until the unruptured cells or granules have swollen.

Preferably the starchy material may be tempered at temperature below its gelatinization temperature to 30%–40% moisture and the so-tempered, flowable material heated in the dry state, preferably in the presence of live steam, until the starchy cells or granules have swollen but not ruptured.

The starchy materials which may be treated in accordance with this process include non-dough forming flours such as corn flour, potato flour, etc., or starches such as corn starch, potato starch, sorghum starch, sago starch, or tapioca starch. It is a particular feature of this invention that it is possible to treat low grade mill streams by the instant invention to produce the desired products.

The preferred starchy materials, typically corn starch or corn flour, normally have a low moisture content of about 10% and, preferably while at room temperature of 60° F.–80° F., may be tempered by addition thereto of water at a temperature below the gelatinization temperature of the starchy material. Preferably the water will be hot, but below 160° F. Adequate water is added to temper the starchy material to 30%–40%, preferably 35% moisture content. If the tempering be to a higher moisture content, e.g. 42% or more in the case of corn flour, localized rupture and pastiness occur in the subsequent operations which preclude attainment of the desired product. Tempering to lower moisture content, e.g. 27% or less, will also not permit attainment of the desired product.

The essentially dry, free-flowing tempered starchy material may then be heated, preferably with agitation, in the presence of live steam. In the preferred embodiment, this may be effected with agitation e.g. in a Beall tube, which is an open-ended tube, typically 6 inches in diameter and 8 feet long equipped with a paddle type agitator and bearing along its length a manifold, permitting admission of live steam. No free moisture is present during heating, and the material, in equilibrium with the atmosphere, may be superficially dry during the entire operation, the moisture pick-up being very slight and less than sufficient to raise the moisture content to above 40%.

Preperably heating in the presence of steam at atmospheric pressure and 212° F. will be effected for 3–5 minutes up to 20–30 minutes. Preferred time of heating is 5–10 minutes and under these conditions of operation, the tempered goods which are being tumbled will have a temperature of about 180° F.–190° F. The starchy materials may be recycled to insure the desired treatment time.

During the heating, the granules of e.g. starch swell but to a point short of rupture. The heating is controlled by reference to the so-called maltese cross test. If ordinary starch granules are illuminated by polarized light and viewed through a microscope, each granule will be found to contain a maltese cross. The heating operation is continued until these maltese crosses have disappeared within the still visible wholly intact cells or granules—this indicating that the granules have substantially swelled without rupture. The product is locked in a swollen state short of rupture.

The free-flowing substantially dry product containing about 40% moisture is characterized by its thin-boiling nature. It can be retained or stored as such without further degradation or deterioration and no further processing is required. Preferably, however, it will be dried down to its original moisture content of about 10% without any damage to the cells, which are locked in swollen state; there is substantially no cell or granule wall rupture or weakening during the course of the instant process.

The thin-boiling free-flowing starchy material prepared by the process of this invention, which will not thicken on heating or gel on cooling, comprises unruptured swollen starchy cells characterized by the absence of maltese crosses when illuminated by polarized light and viewed through a microscope. It will be evident that the process by which the product is prepared, as described above, does not involve the addition of chemical agents.

According to a specific example of this invention, 100 parts by weight of corn flour having a 10% moisture content were tempered to 35% moisture by addition of 38.5 parts of water at 70° F. The substantially dry, free-flowing material was passed through a Beall tube, six inches in diameter and eight feet long. Agitation was provided and live atmospheric steam was admitted. The corn flour was maintained at 180° F. for 3 minutes. At this time, inspection of the cells under a microscope revealed that they were swollen but unbroken. The maltese crosses had disappeared. The product removed from the Beall tube was then dried to 10% moisture by tray drying.

A second example was conducted with corn starch under the same conditions.

The resulting products were found to be characterized by their free-flowing, thin-boiling character. On boiling a 10% suspension of these treated materials, they did not thicken appreciably nor did they form a gel on cooling. The viscosity was substantially the same before heating, during heating and on cooling. On the other hand, suspension of ordinary starchy materials of the same concentration, thicken to paste form on heating and form a gel on cooling.

Although this invention has been described with reference to specific examples, it will be apparent to those skilled in the art that various modifications may be made thereto which fall within the scope of the invention.

What is claimed is:

1. The process of preparing a thin-boiling, free-flowing, starchy material characterized by swollen cells and unbroken cell walls which consists essentially in heating a starchy material in the dry state containing from 27% to 42% moisture until the unruptured cells in the starchy material have swollen.

2. The process of preparing a thin-boiling, free-flowing, starchy material characterized by swollen cells and unbroken cell walls which consists essentially in tempering a starchy material at a temperature below its gelatinization temperature to a moisture content of 27% to 42%, heating said tempered starchy material in the dry state in the presence of live steam until the cells in the starchy material are swollen and unruptured.

3. The process of preparing a thin-boiling, free-flowing starchy material characterized by swollen cells and unbroken cell walls which consists essentially in tempering a starchy material at temperature below its gelatinization temperature to a moisture content of 30%–40%, and heating said tempered material in the dry state until the starchy cells are swollen and unruptured.

4. The process of preparing a thin-boiling, free-flowing starchy material characterized by swollen cells and unbroken cell walls which consists essentially in tempering a starchy material at temperature below its gelatinization temperature to a moisture content of 30%–40%, and heating said tempered material with agitation in the dry state in the presence of steam until the starchy cells are swollen and unruptured.

5. The process of preparing a thin-boiling, free-flowing corn flour characterized by swollen cells and unbroken cell walls which consists essentially in tempering corn flour at temperature below about 160° F. to a moisture content of 30%–40% and heating said tempered material for 3–20 minutes in the dry state until the starchy cells have swollen.

6. The process of preparing a thin-boiling, free-flowing starchy material characterized by swollen cells and unbroken cell walls which consists essentially in tempering a starchy material at temperature below its gelatinization temperature to a moisture content of 35%, heating said tempered material in the dry state in the presence of steam until the starchy cells are swollen and unruptured and drying said heated free-flowing material.

7. The process of preparing a thin-boiling, free-flowing starchy material characterized by swollen cells and unbroken cell walls which consists essentially in tempering a starchy material at temperature below its gelatinization temperature to a moisture content of 35%, heating said tempered material in the dry state in the presence of steam until the starchy cells are swollen and unbroken, and drying said heated, free-flowing material to its initial moisture content.

8. A thin-boiling, free-flowing starchy material which will not thicken on heating and will not gel on cooling which comprises unruptured, swollen cells characterized by the absence of maltese crosses when illuminated by polarized light and viewed through a microscope and which is produced by the process defined in claim 1.

References Cited in the file of this patent

UNITED STATES PATENTS

| | | |
|---|---|---|
| 881,105 | Breyer | Mar. 10, 1908 |
| 1,324,332 | Bloede | Dec. 9, 1919 |
| 2,177,378 | Schorn et al. | Oct. 24, 1939 |
| 2,276,984 | Kauffmann | Mar. 17, 1942 |
| 2,503,053 | Kerr | Apr. 4, 1950 |